United States Patent [19]

Eyers et al.

[11] Patent Number: 5,789,239

[45] Date of Patent: Aug. 4, 1998

[54] COMPOSITION AND PROCESS FOR THE AVOIDANCE OF SLIME FORMATION AND/ OR FOR THE REMOVAL OF BIOFILM IN WATER-BEARING SYSTEMS

[75] Inventors: Mark Emile Eyers, Tienen; Kristine Laura Ignatius Van Pee, Aalter; Jozef Van Poele, Borgerhout; Jurgen Friedrich Schuetz, Antwerpen; Achim Paul Schenker, Eberbach, all of Belgium

[73] Assignee: BetzDearborn Inc., Trevose, Pa.

[21] Appl. No.: 759,492

[22] Filed: Dec. 4, 1996

Related U.S. Application Data

[62] Division of Ser. No. 465,214, Jun. 5, 1995, abandoned.
[51] Int. Cl.$^6$ .................................................. D06M 16/00
[52] U.S. Cl. .................... 435/264; 435/267; 210/632; 210/764; 162/161
[58] Field of Search .............................. 435/264, 267; 210/632, 764; 162/161

[56] References Cited

U.S. PATENT DOCUMENTS

| | | | |
|---|---|---|---|
| 3,717,550 | 2/1973 | Ziffer | 195/63 |
| 3,855,142 | 12/1974 | Pader et al. | 252/135 |
| 4,092,175 | 5/1978 | Martin | 134/42 |
| 4,684,469 | 8/1987 | Pedersen et al. | 210/632 |
| 4,936,994 | 6/1990 | Wiatr | 210/632 |
| 5,206,026 | 4/1993 | Sharik | 424/445 |
| 5,238,572 | 8/1993 | Hernandez-Mena et al. | 210/632 |
| 5,356,800 | 10/1994 | Jacquess | 435/188 |
| 5,411,666 | 5/1995 | Hollis et al. | 210/632 |

*Primary Examiner*—David A. Redding
*Attorney, Agent, or Firm*—Alexander D. Ricci; Richard A. Paikoff

[57] ABSTRACT

The present invention relates to the use of at least one enzyme component from the group consisting of carbohydrases, proteases, lipases and glycol proteases and a short-chained glycol component for the avoidance of slime formation and/or for the removal of biofilm on surfaces of water-bearing systems, in particular of industrial process-water systems. The enzyme component(s) and the glycol component can be added to the water-bearing system either separately, i.e. at different points, or in the form of an enzymatic composition containing the enzyme component (s) and the glycol component.

8 Claims, 13 Drawing Sheets

COMPOSITION AND PROCESS FOR THE AVOIDANCE OF SLIME FORMATION AND/OR FOR THE REMOVAL OF BIOFILM IN WATER-BEARING SYSTEMS

This is a divisional of application Ser. No. 08/465,214 filed Jun. 5, 1995, now abandoned.

BACKGROUND OF THE INVENTION

The present invention relates to the use of at least one enzyme component from the group consisting of carbohydrases, proteases, lipases and glycoproteases and a short-chained glycol component for the avoidance of slime formation and/or for the removal of biofilm on surfaces of water-bearing systems, in particular of industrial process-water systems. The enzyme component(s) and the glycol component can be added to the water-bearing system either separately, i.e. at different points, or in the form of an enzymatic composition containing the enzyme component (s) and the glycol-component.

Industrial process- or operating-water systems, such as e.g. open or closed water-cycle systems of paper factories, in particular cooling-water systems, offer suitable conditions for the growth of microorganisms, with the result that a slime known as biofilm is formed on the surfaces of water-bearing systems. In the case of cooling-water systems in particular, these biofilm deposits can lead to a reduced heat exchange, damage to the joints of pipelines and corrosion within the systems. In this way, adverse effects on process control are possible, which can reduce the efficiency of the industrial process in question or impair product quality. In addition to this, biofilm or slime deposits generally lead to higher energy consumption.

Most affected by an increased biofilm formation are industrial processes such as the manufacture of pulp, paper, board and textiles. In the case of paper machines for example, fairly large quantities of water are recirculated in cycle systems called "white water systems" (primary or secondary cycle, i.e. white water I or II) (up to ca. 100 to 1000 $m^3$ water per ton of paper, depending on paper type). The white water, which contains dispersed pulp, forms an ideal culture medium for the growth of microorganisms.

Biofilm deposits consist primarily of bacteria, in particular gram-negative ones, such as Pseudomonas, Acinetobacter and Aerobacter plus Flavobacterium, Desulfovibrio, Escherichia, Bacillus and Sarcina.

The cell-wall structure of gram-negative bacteria is a factor which contributes particularly to slime formation. The cell wall consists of peptidoglycan, which consists of acetyl amino sugars and amino acids plus an outer membrane composed of proteins, lipopolysaccharides and lipoproteins. In contrast, the cell wall of gram-positive bacteria is mostly composed of peptidoglycan and teichonic acids.

Microorganisms also produce extensive slime layers or capsules which vary in their composition. Apart from a few-exceptions, the slime produced by the bacteria consists of polysaccharides, such as e.g. dextrans, glucans or polyuronides. The volume of slime produced by a single bacterium can be up to many times the volume of the bacterium.

The deposition of the bacterial slimes can most effectively be controlled with biocides, the effect of these biocides being based on the fact that they kill off the microorganisms in the operating water and thus prevent slime production. However, biocides raise many doubts on ecological grounds and, because of their toxicity, pose considerable dangers when handled. For this reason, alternative ways of eliminating biofilm were sought in the past, with particular attention being paid to enzymes.

Although the biofilm matrix can have a heterogeneous composition, it is primarily built up from polysaccharides. Research in the field of slime removal has thus concentrated in particular on studies of polysaccharides (carbohydrases). It was recently found that proteases are effective means of eliminating biofilm or slime (EP-A-590 746). The proteases most used at this time are alkaline proteases, derived from various Bacillus strains, which display advantageous stability properties vis-à-vis bases and are proteolytically active.

U.S. Pat. No. 4,684,469 describes a process in which the antimicrobial activity of a biocide is strengthened by a polysaccharide-degrading enzyme.

U.S. Pat. No. 4,936,994 describes a mixture of cellulase, alpha-amylase and a protease for the removal of biofilm, and the use of a mixture consisting of glucanase and protease for slime removal is described in DE 37 41 583.

Described in WO 92/13807 is a process for the removal of biofilm in which a mixture is used which consists of at least one acid or alkaline protease, at least one glucoamylase or alpha-amylase and at least one surface-active agent (i.e. a detergent (surfactant)), which destroys the polysaccharide material which surrounds the microorganisms adhering to the surfaces of the water-bearing system.

A feature common to the pure enzyme mixtures or enzymatic compositions used to date is that they often have to be combined with a biocide in order to achieve the degree of effectiveness necessary in practice (cf. e.g. U.S. Pat. No. 5,324,432).

The object of the present invention is therefore to make available a composition or a process for the avoidance of slime formation and/or for the removal of biofilm on surfaces of water-bearing systems which avoids the disadvantages of conventional biocides but achieves their degree of effectiveness.

DESCRIPTION OF THE PREFERRED EMBODIMENTS

According to the invention, the object is achieved in that at least one enzyme component from the group consisting of carbohydrases, proteases, lipases and glycol proteases and a glycol component of the general formula $$R^2(-O-R^1)_n-O-R^3$$

is added to the water-bearing system, whereby n is an integer smaller than 10, $R^1$ is an alkyl residue with 2 or 3 carbon atoms and $R^2$ and $R^3$ are in each case independently of each other hydrogen, an alkyl group with 1 to 6 carbon atoms or an aryl group.

The aforementioned alkyl groups of the glycol component can be both linear and branched. Understood in particular by the term aryl are radicals with 6 to 14 carbon atoms which can contain alkyl substituents. The alkyl or aryl residues $R^1$, $R^2$ and $R^3$ can in each case be the same or different.

Within the framework of the present invention, the enzyme component(s) and the glycol component are preferably added to the water-bearing system at the same time.

According to a preferred embodiment of the invention, the combined addition of enzyme(s) and glycol component takes place in the form of a composition which comprises at least one enzyme component from the group consisting of carbohydrases, proteases, lipases and glycol proteases and a glycol component of the general formula $$(R^2(-O-R^1)_n-O-R^3$$

whereby n, $R^1$, $R^2$ and $R^3$ have the meaning given above.

The composition of the invention preferably contains the glycol component in a concentration of 10 to 80 wt.-% relative to the total composition, preferably in a concentration of 20 to 60 wt.-%. According to a particularly preferred version of the invention, the concentration of the glycol component is 20 to 40 wt.-%.

The quantity of the enzymes in the composition according to the invention lies between 90 and 1 wt.-%, preferably between 90 and 20 wt.-%, whereby 50 to 20 wt.-% are most preferred (relative in each case to the weight of the composition in liquid form). The difference to 100 wt.-% of the composition can be made up by water.

Glucanase (alpha- and beta-glucanase), fucosidase or pectinase are preferred as enzymes from the class of the carbohydratases. Esperase® (serine protease, Novo) or Neutrase® (metallo-protease, Novo) come into consideration in particular in the class of the proteases. Liponase® (acetylesterase) is particularly suitable as a lipase, and endo-glycosidase is preferred among the glycol proteases.

While the aforementioned enzymes alone do not remove biofilm sufficiently, it was surprisingly found that the combination of the enzymes with the aforementioned low-chained glycol component in the form of a composition added to the water-bearing system or by simultaneous use (addition) of enzyme component(s) and glycol component brings with it a dramatic improvement in slime reduction. The formation of new biofilm is also greatly reduced. Since even relatively small quantities of the composition are effective, the quantity of enzyme effectively necessary per liter of process or operating water can be greatly reduced.

It is known in the prior art that, when the pH value of the water is neutral, the marked increase in the bacteria cell count gives rise to increased problems through slime formation, which experience shows can be controlled only with great difficulty even when biocides are used. It was able to show according to the invention that, even when the pH value of the water is neutral, slime formation can be avoided and/or biofilm on the surfaces of the water-bearing system can be removed if the aforementioned enzyme component(s) and the glycol component are added to the system (again either separately or in the form of an enzymatic composition).

According to a particularly preferred embodiment of the invention, an enzymatic composition is made available which contains beta-glucanase and diethylene glycol, whereby diethylene glycol is present in a proportion of 10 to 80 wt.-%, preferably 20 to 60 wt.-%, relative to the total composition. In the composition which is particularly preferred according to the invention, beta-glucanase is contained in a proportion of 43 wt.-% and diethylene glycol in a proportion of 25 wt.-%, the difference to 100 wt.-% being made up by water.

The compositions of the present invention develop surprising effectiveness during the degradation of slime and/or for preventing the formation of slime on surfaces of water-bearing systems. According to the invention, water-bearing systems are understood to be in particular industrial process- or operating-water systems, i.e. open and closed cycles such as e.g. cooling-water cycles. The compositions according to the invention are suitable in particular for use in primary, secondary and/or tertiary cycles of paper factories (i.e. white water I and II, residual waste water; cf. e.g. Ullmanns Encyklopädie der technischen Chemie, 4th Ed., Verlag Chemie, Weinheim, Volume 17, p. 577 et seq.), which are ideal culture media for microorganisms and in which the formation of slime and biofilm deposition represents a major problem. The tendency towards slime formation is at its greatest in the chalk water-bearing cycle, and an inadequate removal of the biofilm leads to a reduction in paper quality, to paper machine operating failures and thus to an increase in operating costs. It has been shown that the composition according to the invention is suitable to a surprising extent for the elimination of these problems.

The composition of the present invention develops its surprising effectiveness in numerous other water-bearing systems such as open or closed water-cycle systems, cooling cycles and the like. As a result of the degradation of slime and the avoidance of the formation of new slime, the durability of the water-bearing systems is improved, with the tendency towards corrosion in particular being greatly reduced.

The present invention also relates to the use of the composition according to the invention for the avoidance of slime formation and/or for the removal of biofilm in water-bearing systems, in particular in industrial process-water systems, in which the composition is added to the system in a quantity of 5 to 200 ppm relative to the volume of water to be treated.

The compositions of the present invention are ecologically acceptable, non-toxic and display a clearly higher effectiveness compared with the known enzyme-containing purification compositions. The replacement of conventional, toxic biocides is of most advantage for the aforementioned applications.

Enzymes possess a pH value optimum which is specific to their activity. For the composition according to the invention, depending on the pH value present in the water-bearing system, the pertinent optimal enzymes can be selected for the composition according to the invention.

The invention is explained below with reference to examples.

EXAMPLE 43 wt.-% beta-glucanase, 25 wt.-% diethylene glycol and 32 wt.-% water were mixed to produce an enzymatic composition (Enzyme formula A).

Figure 1:
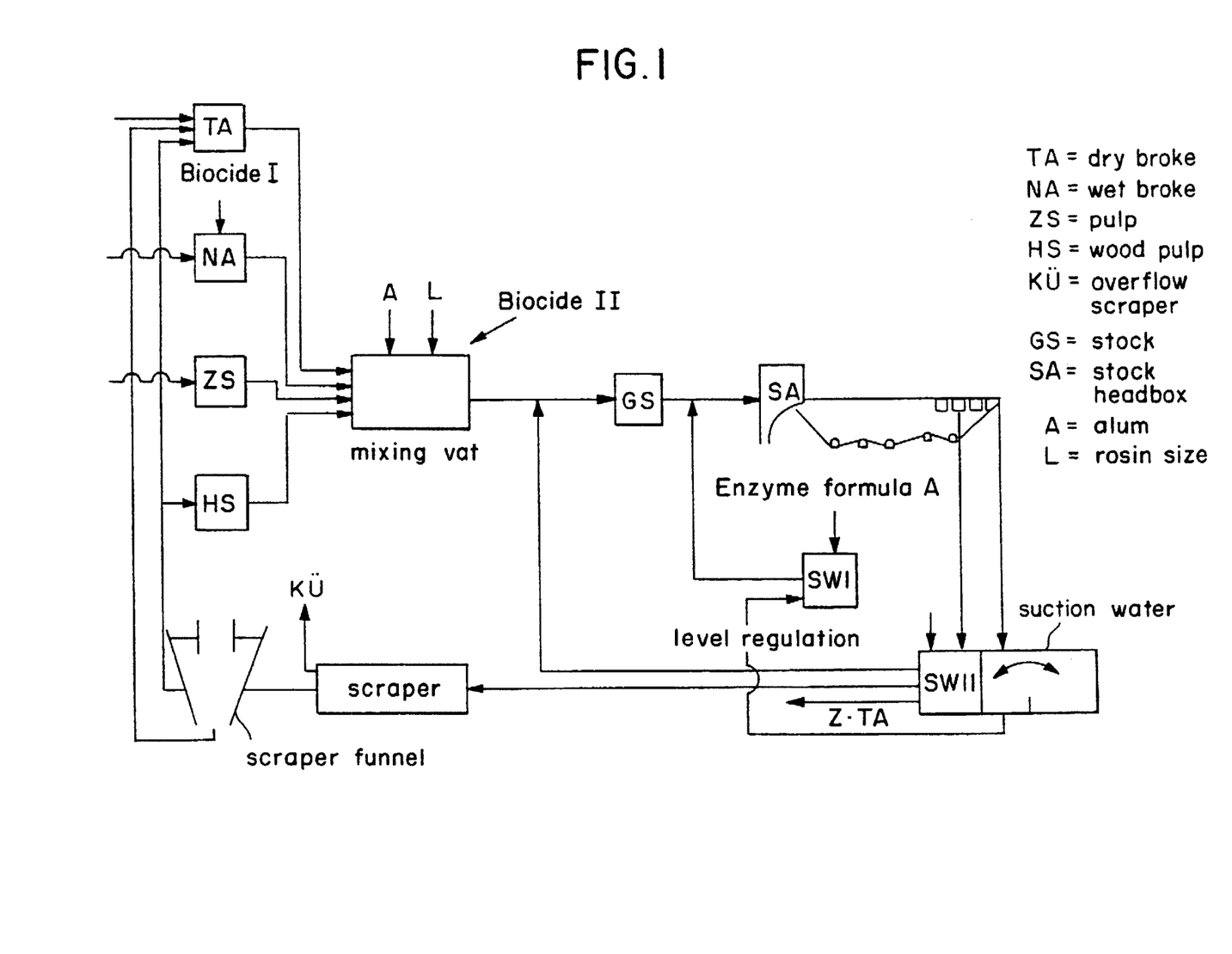
FIG. 1 diagrams the structure of the water cycles for the paper machines used to test the composition according to the invention.
Figure 2:
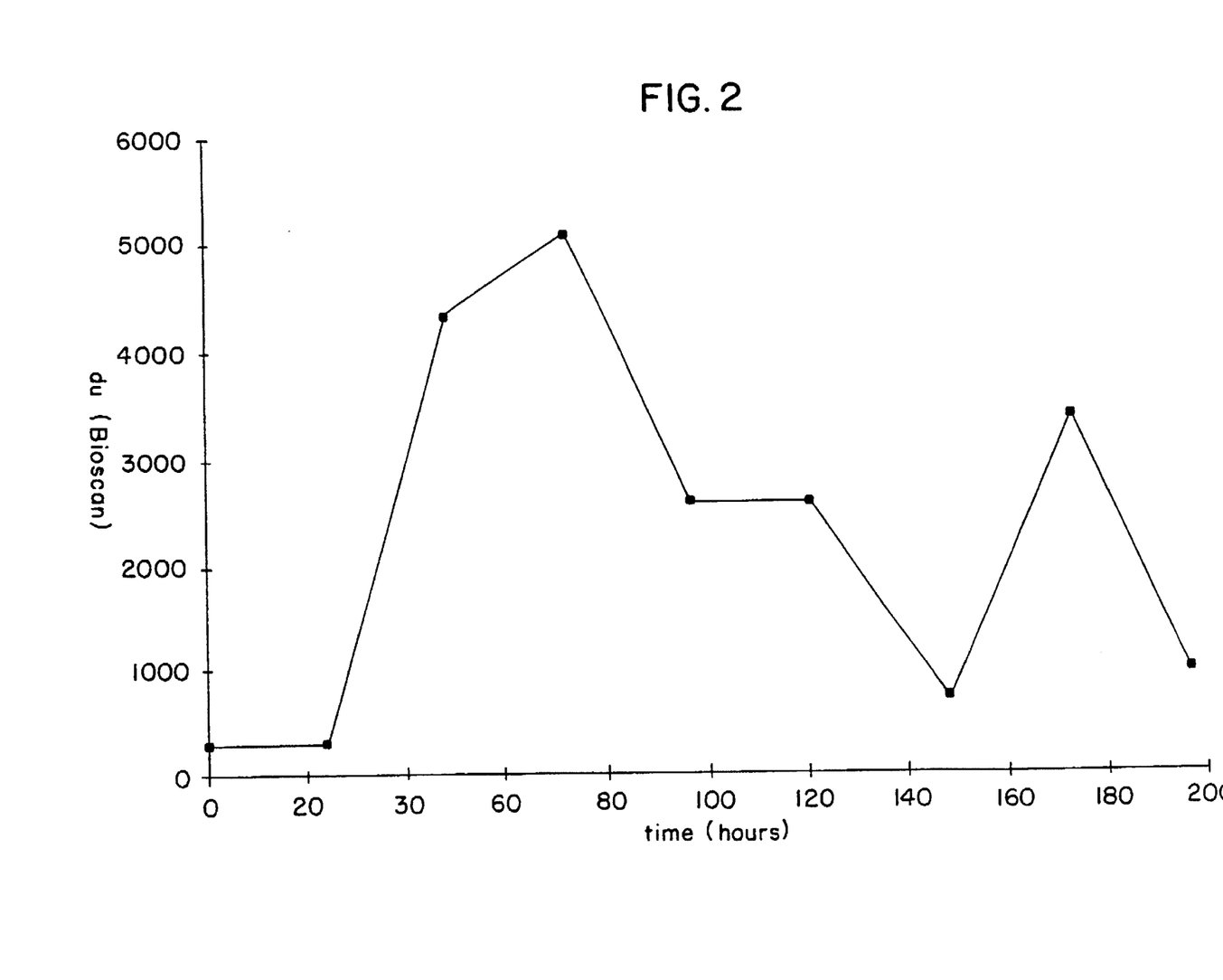
FIG. 2 shows ATP measurements in white water using "bioscan" (cycle 1).
Figure 3:
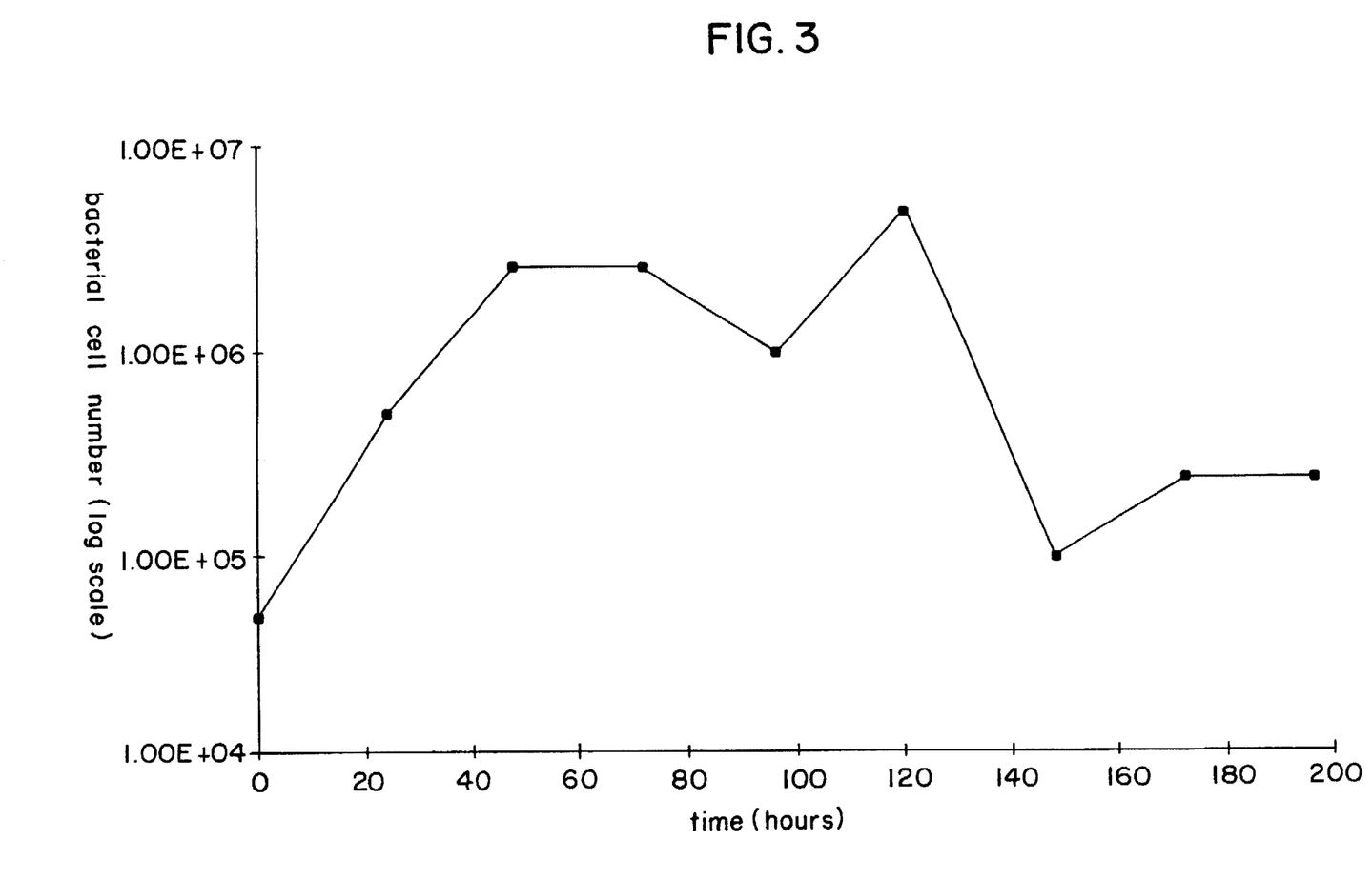
FIG. 3 shows the total bacterial counts in white water (cycle 1).
Figure 4:
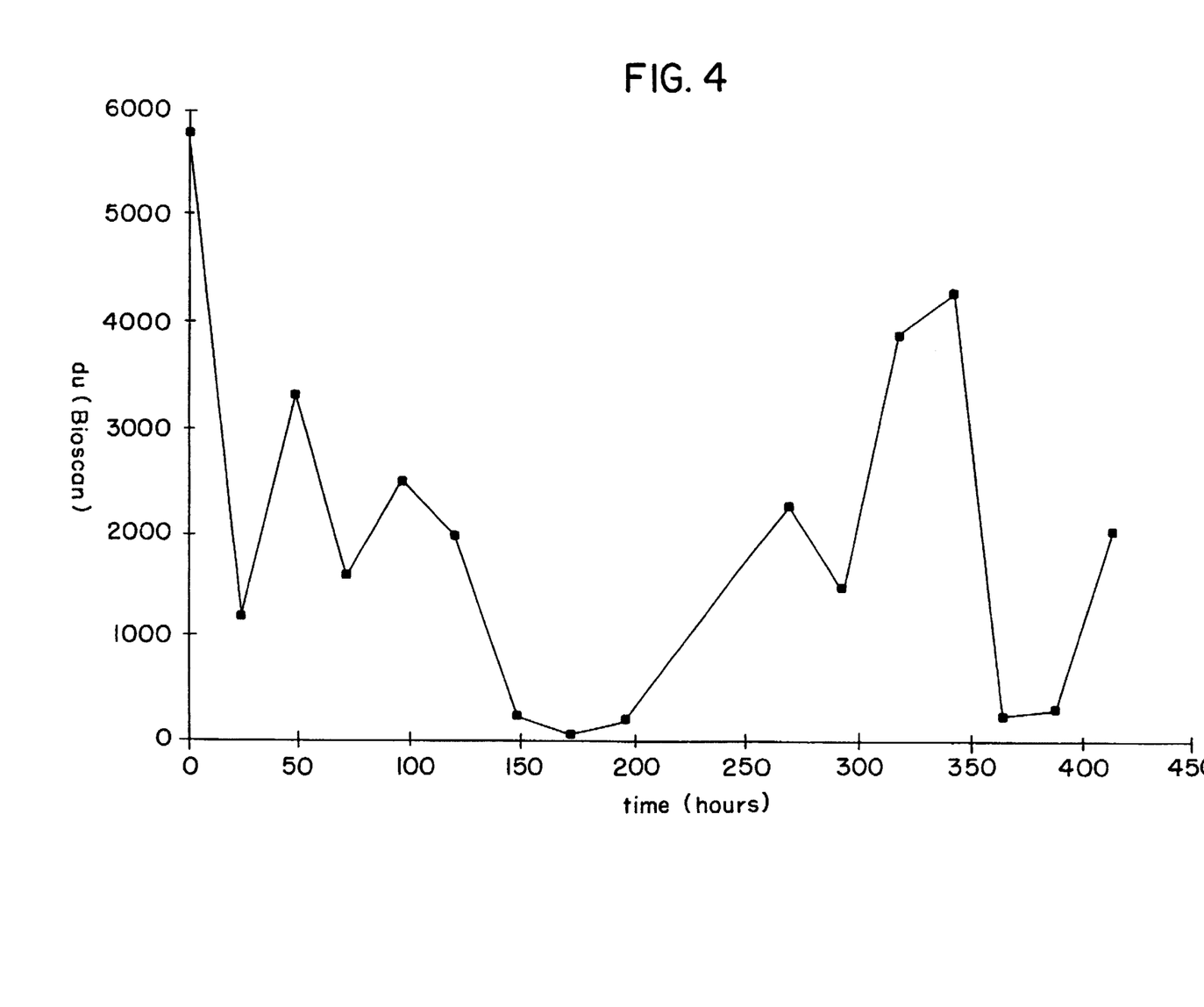
FIG. 4 shows ATP measurements in white water using "bioscan" (cycle 2).
Figure 5:
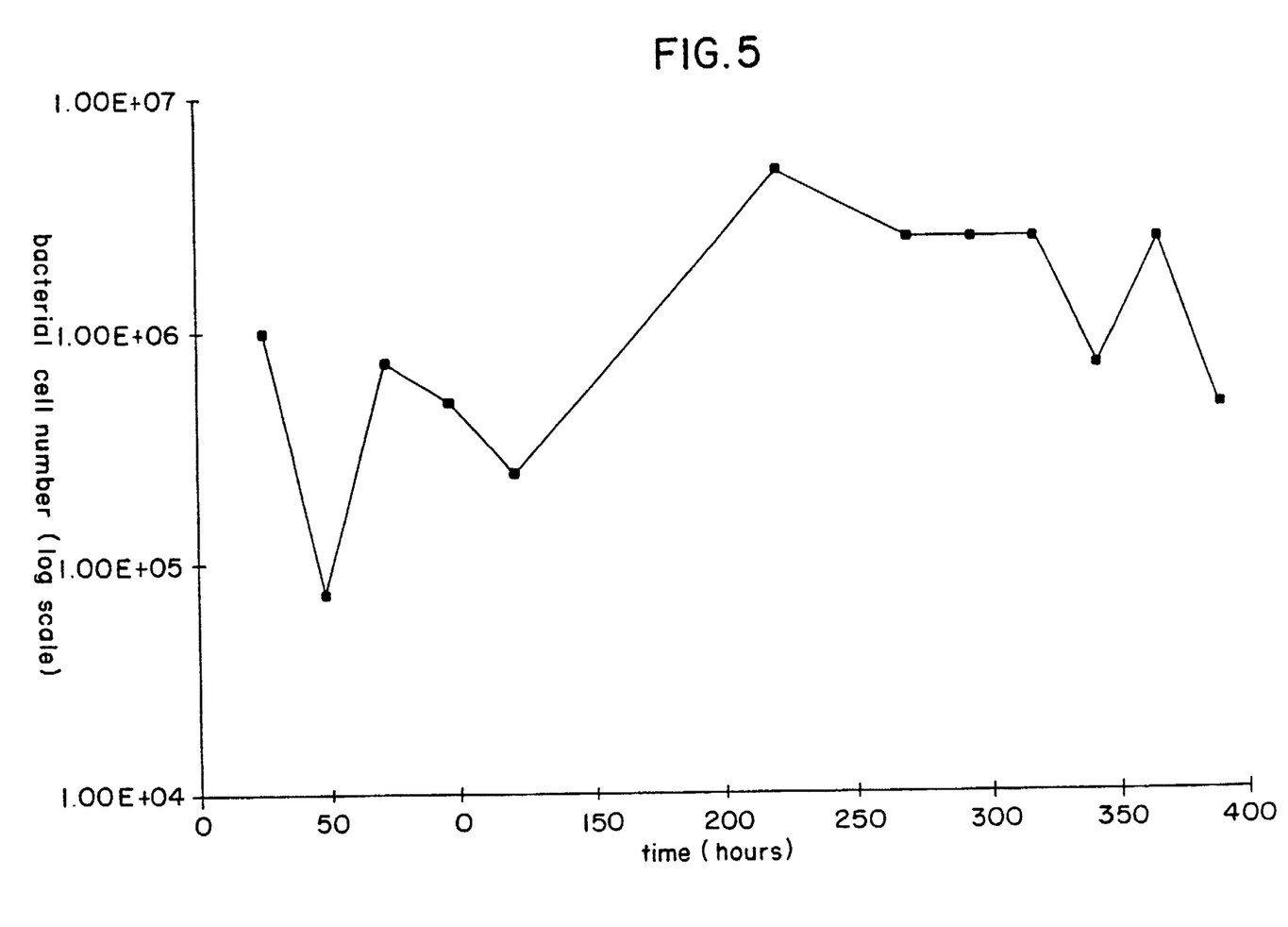
FIG. 5 shows total bacterial counts in white water (cycle 2).
Figure 6:
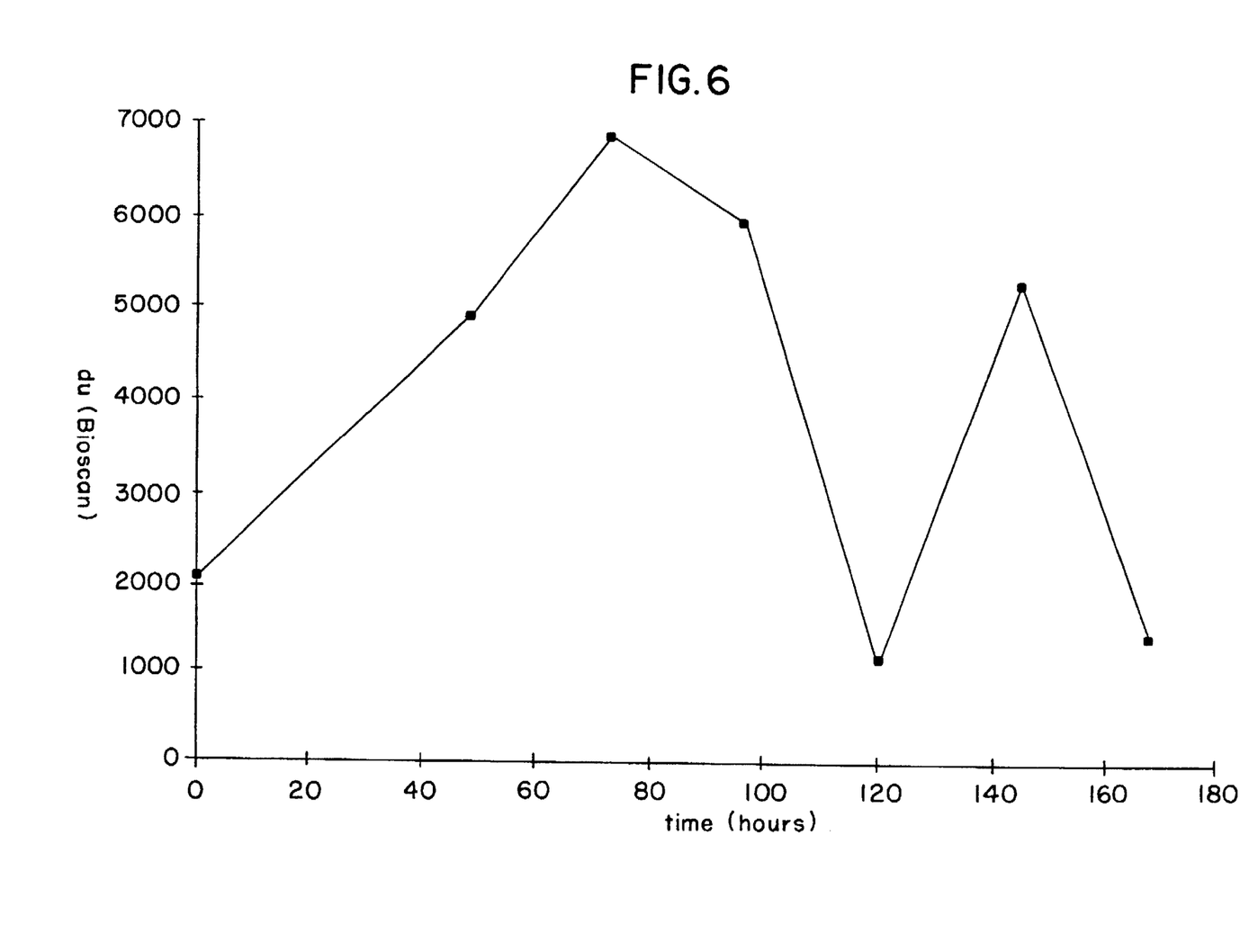
FIG. 6 shows ATP measurements in white water using "bioscan" (cycle 3).
Figure 7:
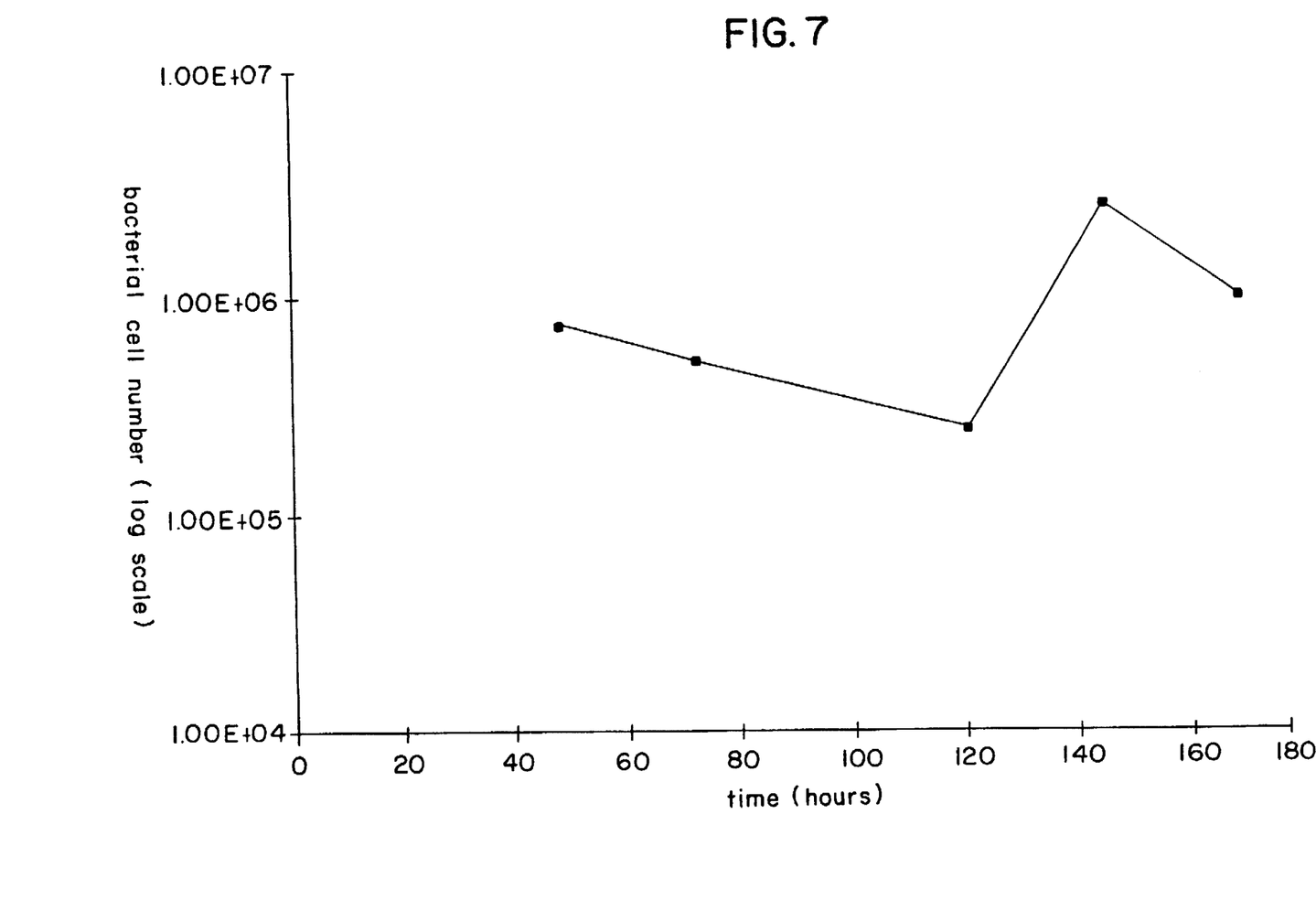
FIG. 7 shows total bacterial counts in white water (cycle 3).
Figure 8:
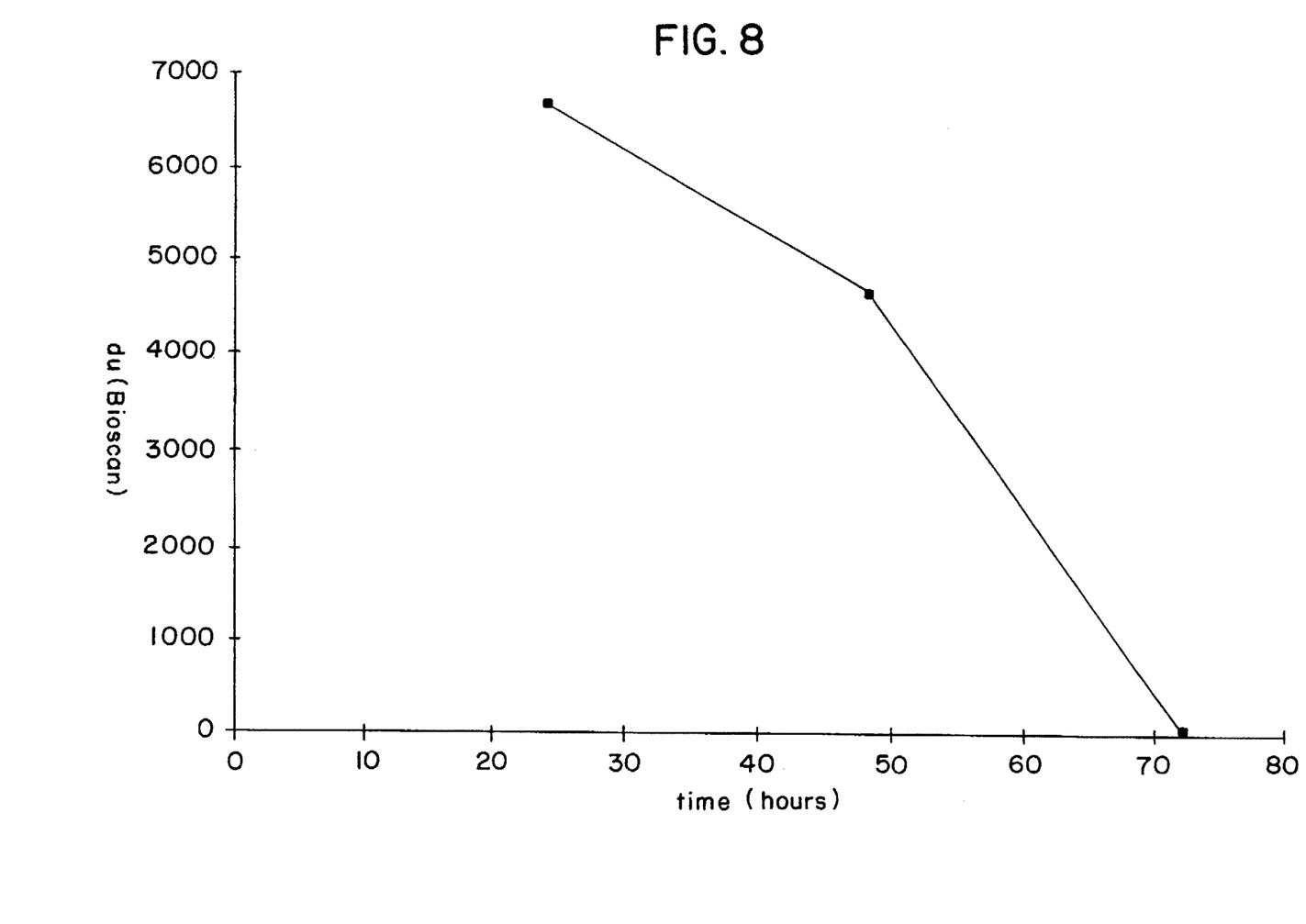
FIG. 8 shows ATP measurements in white water using "bioscan" (cycle 4).

This composition was used to remove biofilm and to avoid the (re)formation of slime in the water cycle of two paper machines of a paper factory. The paper machines had a total capacity of ca. 180,000 tons/year SC paper. The structure of the water cycles for the paper machines which were used to test the composition according to the invention is diagrammatically represented in FIG. 1, where appropriate locations for the metered addition of enzymatic compositions are marked.

Preparatory Work for Conducting the Field Trial

Installation of the Dosing Apparatus

Several days before the start of the field trial, the Grace Dearborn DCS3020 dosing apparatus was installed. The following feed locations (dosing points) were selected:

1. The composition according to the invention EUR8830 was introduced in a container at the headbox of paper machine PM1 (white water: the dosing point is designated "SWT" in Table 1 and FIG. 1).
2. The biocide formulation I (containing 18 wt.-% 2,2-dibromo-3-nitrilopropionamide (DBNPA)) was fed into the stock "Debro" consistency sensor (the dosing point is designated "stock" in Table 1).
3. The biocide formulation II (containing 45 wt.-% Preventol AS 2 and 2 wt.-% dithiol) was fed into the waste "Debro" consistency sensor (the dosing point is designated "broke" in Table 1).

Two "gamma/5" pumps (ProMinent) were installed for the addition of the biocide formulations, and a "Vario" pump (ProMinent) was used for the addition of the composition according to the invention. All the pumps were calibrated before the start of the practical testing of the composition according to the invention.

Field Trial

The filed trial was started after the machines had been thoroughly cleaned. The dosage quantities during the four cycles of the study are shown in Table 1.

During the first cycle, which lasted 9 days, the composition according to the invention was added to the white water (4×30 minutes per day, 1458 ml/min); the biocides were added into the stock (4×30 minutes per day parallel to the formulation according to the invention 60 ml/min) and into the broke (3×30 minutes per day 75 ml/min). While the biocide dose was reduced by aprroximately 50% in the second cycle, which lasted 20 days, the dosage of the composition according to the invention was not changed (4×30 minutes per day, 1458 ml/min). During the third cycle, which lasted 9 days, the dosage of the composition according to the invention was reduced by 50% (4×30 minutes per day, 730 ml/min). Immediately thereafter, the 4th cycle was started without addition of biocide into the short cycle (i.e. without addition of D7806), the added quantity of the formulation according to the invention being reduced once again by ca. 68% (4×30 minutes per day, 500 ml/min). The papre machine was now treated for 20 days with Enzyme formulation A only. A small amount of biocide I was used for broke conservation, not part of the white water.

The outcome of the field trial using the aforementioned enzymatic composition was monitored as follows:

1. The mixture of the planktonic microorganisms populations was measured daily by ATP measurements (Bioscan) and total bacteria counts (Petri film and dipslides) in the white water, in the stock and in the broke. (The ATP measurements are based on the principle that, during the change from ATP to AMP in the presence of luciferin and luciferase, in each case defined quantities of light are emitted per ATP molecule, which are measured by sensitive photometers). The results of the measurements in the white water are shown in FIGS. 2–8. There was no significant increase in the bacteria cell counts or the "relative light unit" (rlu) values. The figures show the typical microbial activity of a system which displays no problems attributable to slime formation, i.e. in which the formation of slime is effectively suppressed.

2. The machine was checked constantly for slime formation and for the problems associated with it. During the trial, no microbiologically caused problems were observed in the paper machine. Nor was it necessary in any case to stop the paper machine because of slime formation.

Figure 9:
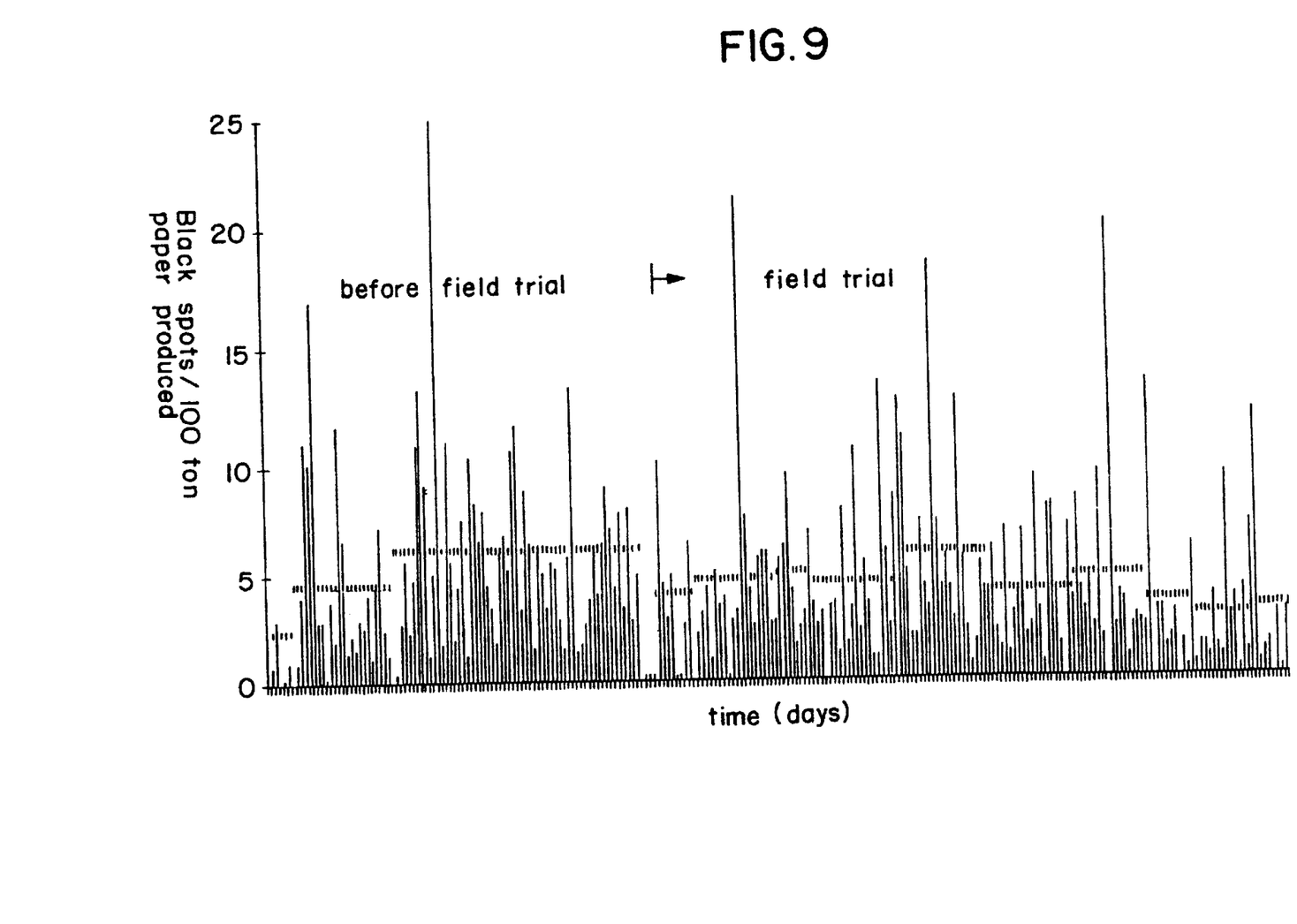
FIG. 9 shows statistics of black spots/100 ton paper produced before and during the field trial. The vertical bars represent the day by day measurements, and the horizontal bars represent the average of a machine cycle.
Figure 10:
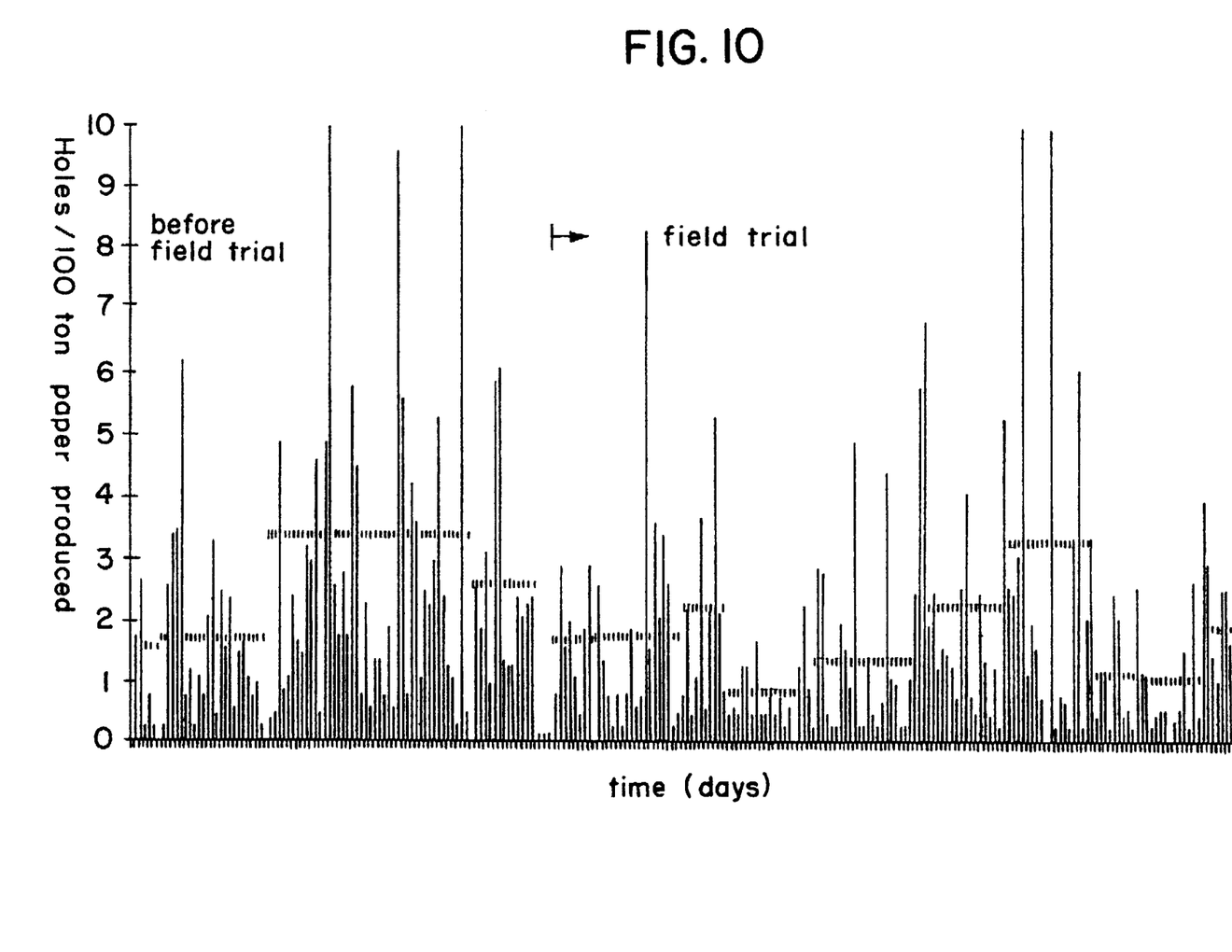
FIG. 10 shows statistics of holes/100 ton paper produced before and during the field trial. The vertical bars represent the day by day measurements, and the horizontal bars represent the average of a machine cycle.

3. The paper quality was likewise continuously monitored. The statistical distribution of dark spots and holes in the paper before, during and after the addition of the composition according to the invention was ascertained. It was shown that there is no significant difference, in terms of the number of black spots and holes in the manufactured paper, compared with the paper quality when using biocides (cf. FIGS. 9 and 10).

4. After a successful field trial over a period of three months, the paper machine was altered to neutral operation. The paper machine was monitored as already previously (see above).

It was shown that, even with a neutral pH value, the addition of the enzymatic composition prevents the occurrence of problems which are attributable to the formation of slime or biofilm.

The paper machine was constantly monitored, and no biofilm depositions were observed. The machine looked-very clean and did not have to be stopped because of microbiological problems, even after the changeover to the neutral pH value.

Figure 11:
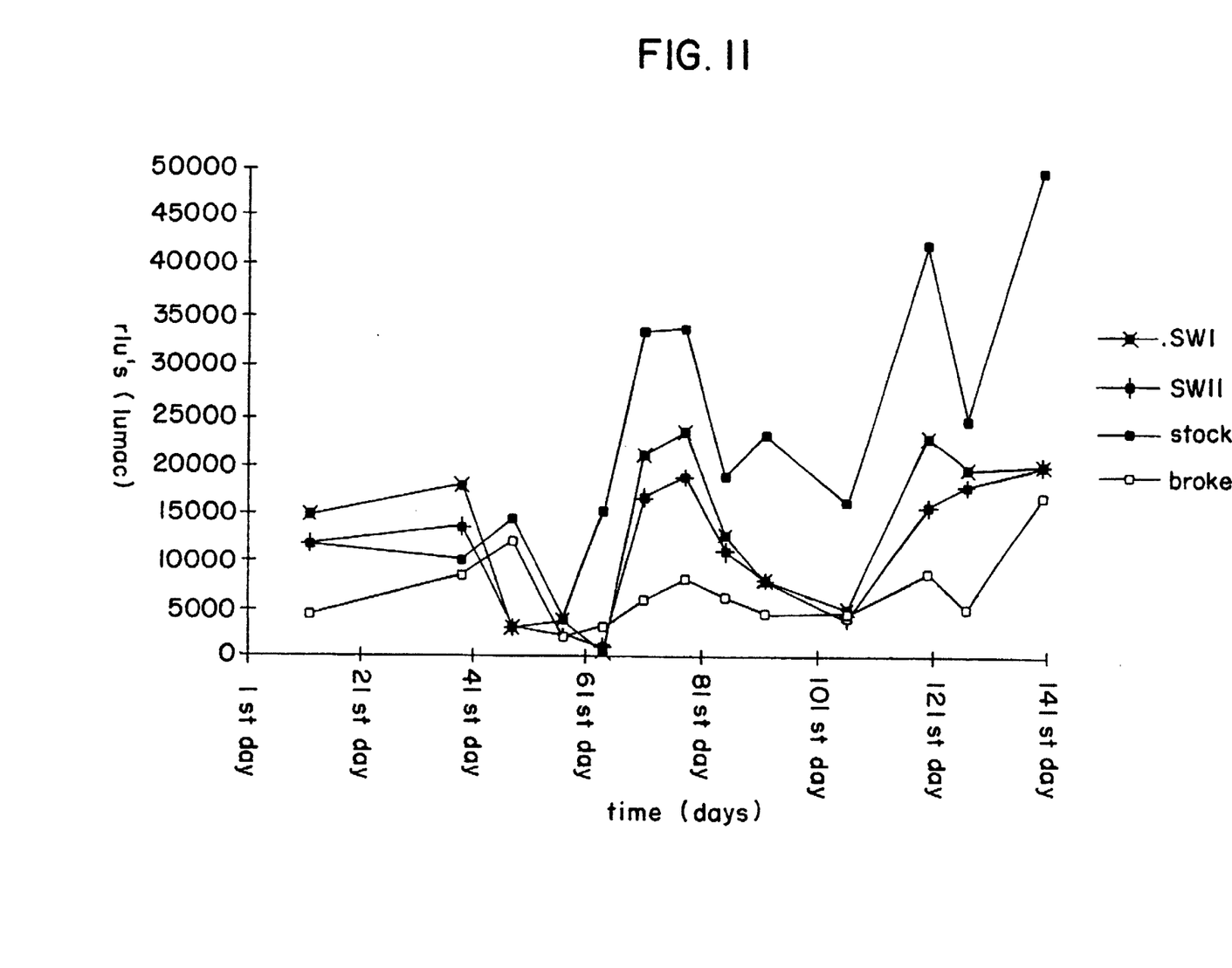
FIG. 11 shows ATP measurements in the white water, stock and broke.
Figure 12:
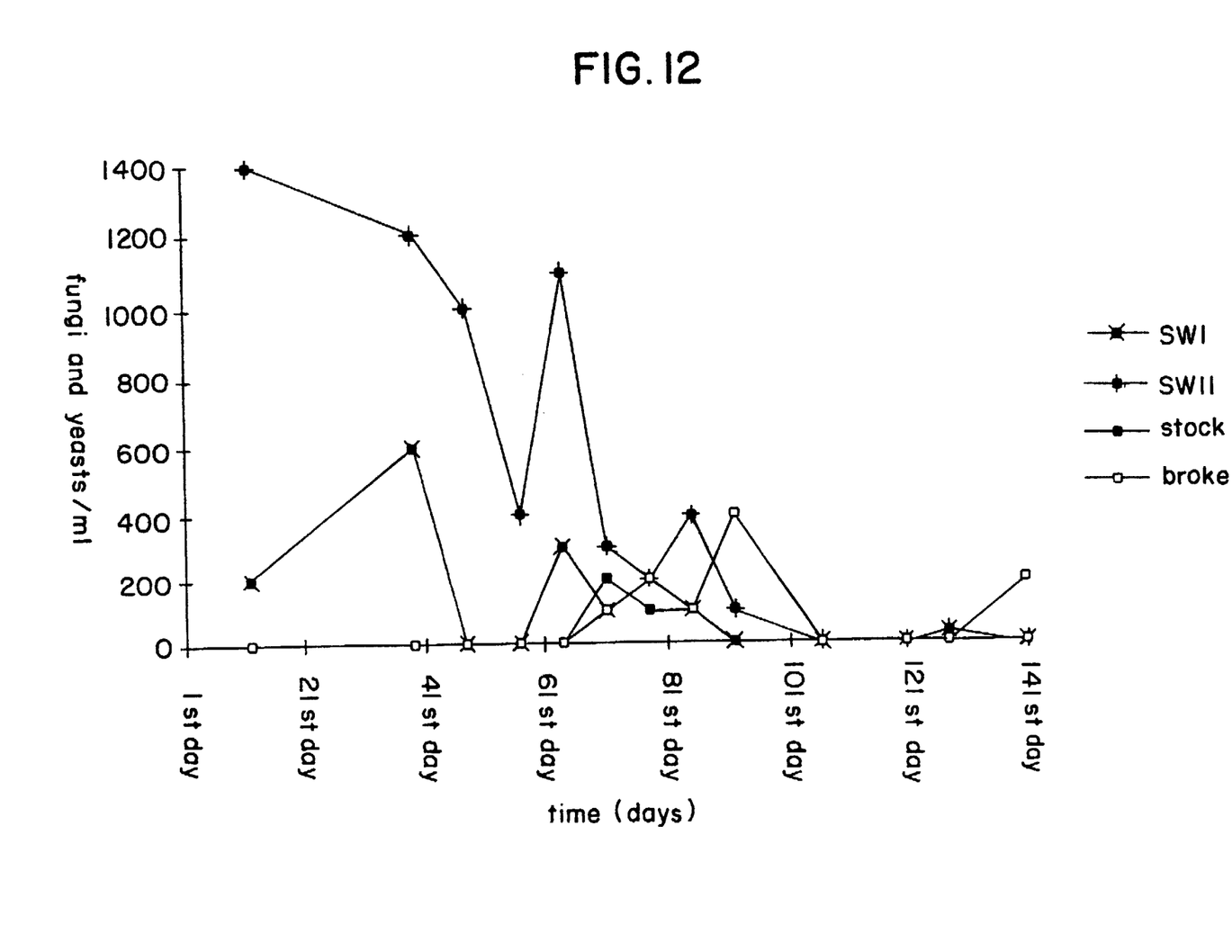
FIG. 12 shows fungal and yeast counts in the white water, stock and broke.
Figure 13:
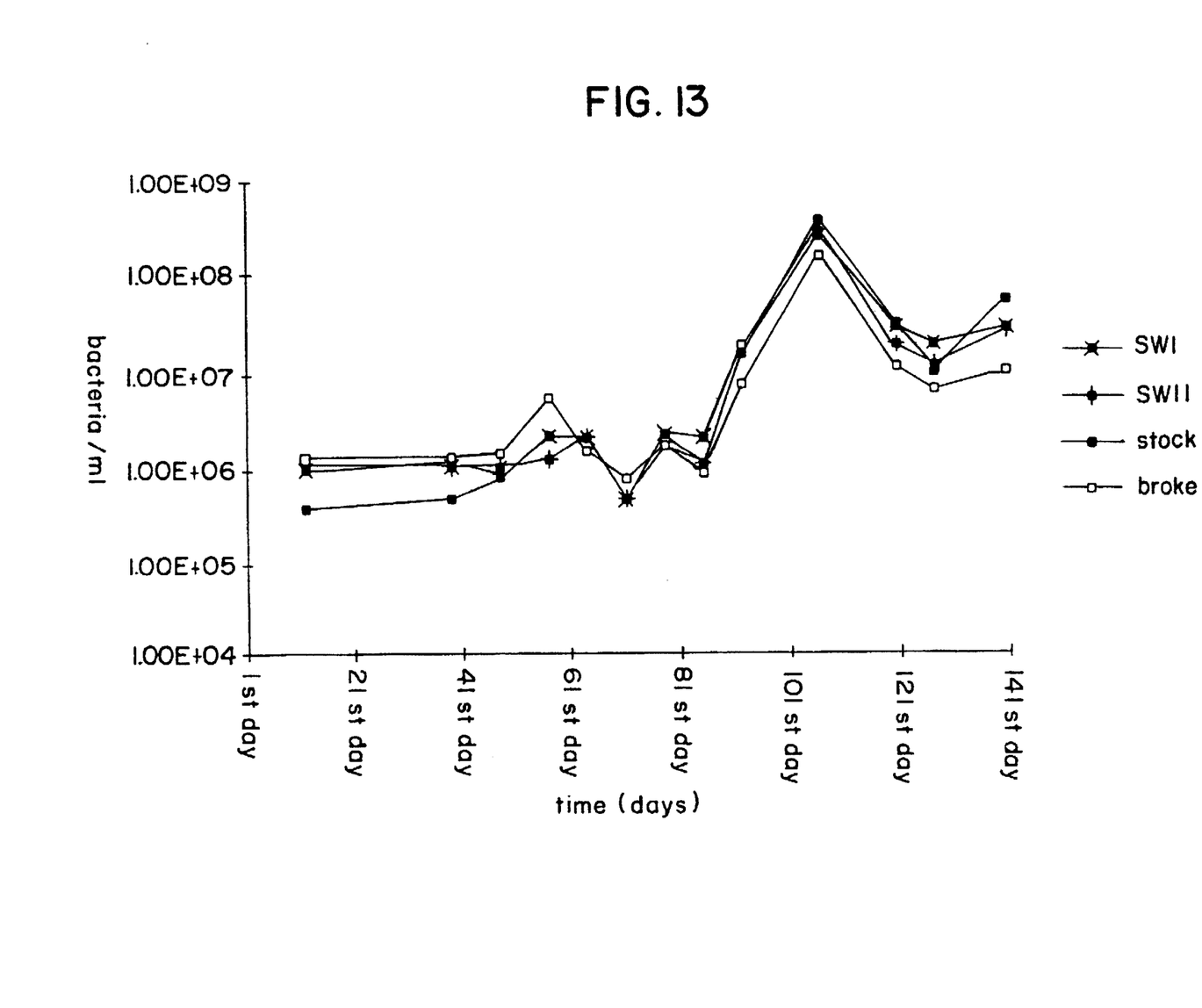
FIG. 13 shows bacterial cell counts in the white water, stock and broke.

The determination of the bacteria cell count, the quantitative recording of yeasts and fungi and the ATP measurements in the white water, in the stock and in the broke were carried out at regular intervals. It was found that the bacteria cell count rises initially, finally to achieve an equilibrium. The reduction in the proportion of yeasts and fungi is attributable to the neutral pH value (cf. FIGS. 11 to 13).

Despite the increase in the bacteria cell count, no problems attributable to slime or biofilm formation were observed when using the enzymatic composition according to the invention. The number of black spots and holes did not increase despite the higher bacteria cell counts, which indicates that the simultaneous addition of the said enzyme component(s) and glycol component is extremely effective according to the invention as regards the suppression of slime formation.

Summary of the Results

The use of the composition according to the invention led to results which are comparable with the use of biocides. The slime deposits were effectively eliminated (even at neutral pH value) and the formation of new biofilm was effectively suppressed. The use of the compositions according to the invention for slime removal thus represents an alternative to the use of biocides in industrial process-water systems which is effective and environmentally compatible, in contrast to biocides, and is also favourable in cost terms.

Holes and cracks in paper machines can be reduced by the compositions according to the invention, and odour problems as well as microbially caused blockages in the water-bearing system can be effectively combatted.

TABLE 1

| dosing point | product | interval | ml/min | kg/d |
|---|---|---|---|---|
| Dosage regime Cycle PM1 | | | | |
| Phase 1 (9 days) | | | | |
| broke | biozid I | 3 × 30 | 75 | 7.97 |
| stock | biozid II | 4 × 30 | 60 | 8.21 |
| SWI | enzyme A | 4 × 30 | 1458 | 192.45 |
| Phase 2 (20 days) | | | | |
| broke | biozid I | 3 × 30 | 50 | 5.31 |
| stock | biozid II | 4 × 30 | 30 | 4.1 |
| SWI | enzyme A | 4 × 30 | 1458 | 192.45 |
| Phase 3 (9 days) | | | | |
| broke | biozid I | 3 × 30 | 50 | 5.31 |
| stock | biozid II | 4 × 30 | 30 | 4.1 |
| SWI | enzyme A | 4 × 30 | 730 | 96.36 |
| Phase 4 (20 days) | | | | |
| broke | biozid I | 3 × 30 | 50 | 5.31 |
| stock | biozid II | | | |
| SWI | enzyme A | 4 × 30 | 500 | 65.4 |

We claim:

1. A method for the removal of biofilm and for the prevention of slime formation on surfaces of a water-bearing system comprising adding to said water-bearing system an amount, effective for the purpose of an enzyme component and a glycol component, wherein said enzyme component is a beta-glucanase and said glycol component is a diethylene glycol.

2. The method according to claim 1, characterized in that the enzyme component(s) and the glycol component are added to the water-bearing system at different points.

3. The method according to claim 1, characterized in that the enzyme component(s) and the glycol component are added to the water-bearing system in the form of an enzymatic composition according to claims 1 to 10.

4. The method according to claim 3, characterized in that the enzymatic composition is added in a concentration of 5 to 200 ppm.

5. The method according to claim 1, characterized in that the water-bearing system is an open or closed industrial process-water system.

6. The method according to claim 5, characterized in that the industrial process-water system is an open or closed water cycle in a paper factory.

7. The method according to claim 6, characterized in that the water-bearing system is the white water-bearing cycle of a paper factory.

8. The method according to claim 5, characterized in that the water-bearing system is a cooling cycle.

* * * * *